J. A. COWAN.
CULTIVATOR.
APPLICATION FILED MAR. 29, 1918.
1,302,317.
Patented Apr. 29, 1919.
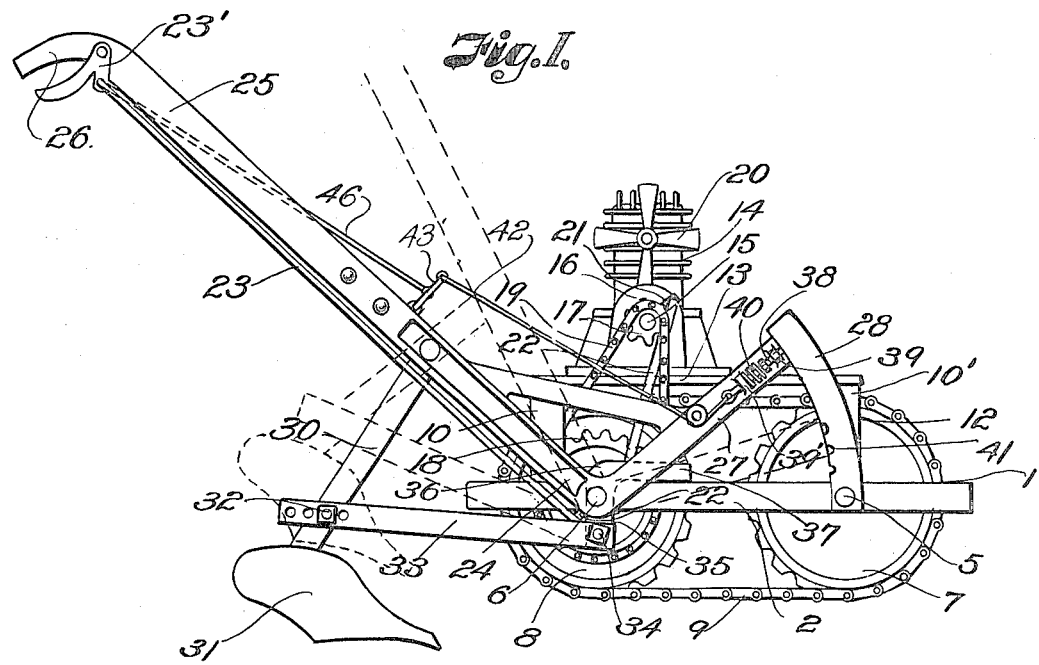
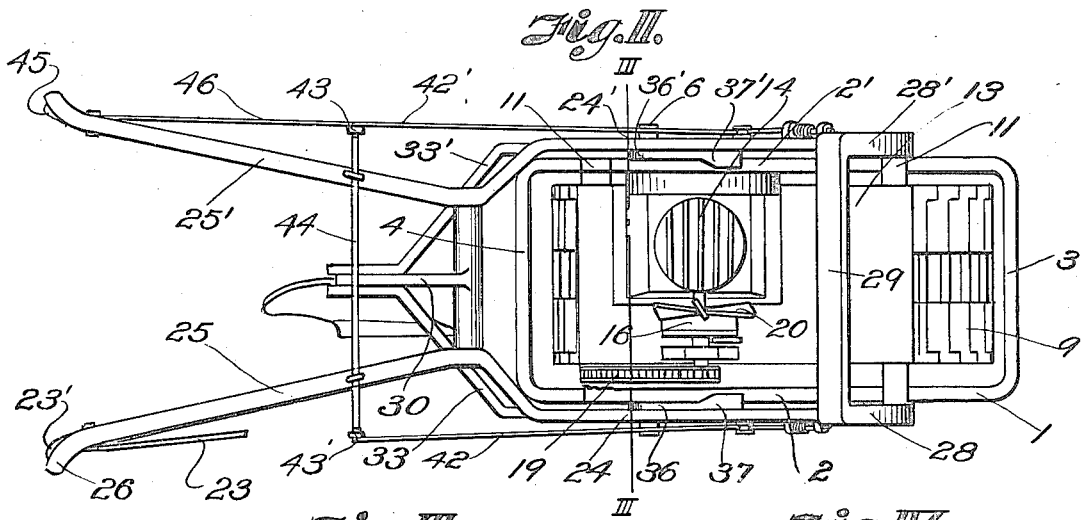
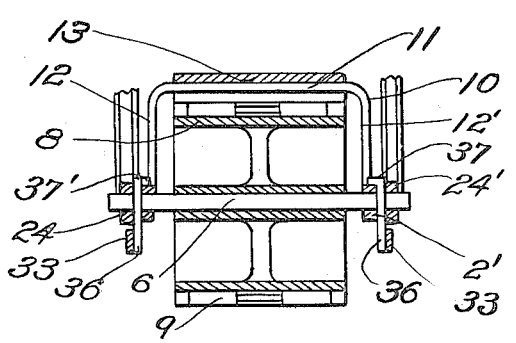
INVENTOR.
John A. Cowan.
BY Arthur C. Brown
ATTORNEY

UNITED STATES PATENT OFFICE.

JOHN A. COWAN, OF KANSAS CITY, MISSOURI.

CULTIVATOR.

1,302,317.  Specification of Letters Patent.  Patented Apr. 29, 1919.

Application filed March 29, 1918. Serial No. 225,458.

*To all whom it may concern:*

Be it known that I, JOHN A. COWAN, a subject of the King of England, residing at Kansas City, in the county of Jackson and State of Missouri, have invented certain new and useful Improvements in Cultivators; and do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cultivators and more particularly to a cultivator adapted for small farm or garden work; the principal object of the invention being to provide a light, efficient and easily handled cultivator of this character that may be operated successfully between closely spaced rows of growing plants and comprising means for propelling the same over the ground, improved means for steering or guiding, and readily adjustable parts for retaining a ground working tool carried thereby at an adjusted position.

In accomplishing these objects I have provided improved details of structure the preferred forms of which are illustrated in the accompanying drawings; wherein:—

Figure I is a side view of a cultivator constructed according to the present invention.

Fig. II is a plan view of the same.

Fig. III is a transverse sectional view on the line III—III Fig. II, illustrating the ground wheel mounting.

Fig. IV is a detail sectional view on the line IV—IV Fig. I illustrating a guide arm and lock member.

Referring more in detail to the drawings—

1 designates a rectangular frame preferably of iron construction, comprising opposite side rails 2—2' and front and rear connecting rails 3—4 respectively.

Mounted transversely across the frame and supported at their opposite ends in the frame rails 2—2' are front and rear shafts 5—6 respectively, on which ground or belt carrying wheels 7—8 are revolubly mounted, and running over said wheels is a traction belt 9, of any suitable link construction, whereby increased traction and extended bearing surface is provided and which permits the device to be operated successfully over soft, marshy or uneven ground.

Mounted adjacent the opposite ends of the frame 1 are supporting bars 10—10', each comprising a horizontal transverse portion 11 and vertical opposite end portions 12—12'; the latter being of sufficient length and substantially fixed to the frame side rails 2—2' to support the horizontal portions above the belt carrying wheels 7—8, and mounted on said horizontal members is a plate or table 13 whereon a motor 14, preferably a gasoline or other internal combustion engine, is fixed.

The engine 14 comprises a drive or crank shaft 15 that, through a suitable clutch mechanism indicated by the casing 16, drives a sprocket wheel 17 mounted on the outer end of the shaft, and running over said sprocket wheel 17 and a larger coöperating sprocket wheel 18 fixed to one end of the rear traction or belt wheel 7 is a chain belt 19 whereby, when the clutch is moved into locking relation with the sprocket wheel 17, the ground wheels will be operated to move the cultivator over the ground surface.

The engine may be provided with a cooling fan 20 to be operated by suitable connections with driving parts of the engine and provided also with the usual control mechanism, not shown herein as it forms no part of the present invention. The clutch mechanism indicated at 16 may be operated into or from clutching relation by any suitable means, here shown to be the lever 21 which is operated by a connecting rod 22 that extends to a pivotally mounted lever 22' on the axle 6 and the latter is actuated by a rod 23 that extends rearwardly to such a position on the handle parts presently described, where it may be attached to a hand lever as indicated at 23' and thereby be under ready control of the operator.

The means employed for guiding the device and for controlling the working depth of tools drawn thereby comprises a pair of adjustably mounted handles 24—24' that are pivotally mounted at their forward ends on the opposite ends of the rear wheel shaft 6; each of the said handles comprising upwardly and rearwardly extending arms 25—25' provided at their upper ends with downturned or gripping portions 26 and with upwardly and forwardly extending guide arms 27 forwardly of their pivotal points which are adapted to move at their forward ends in paired arcuate guide ways 28—28' fixed to the side rails 2—2' adjacent to the forward end of the frame 1; the said guide ways being U-shaped in cross section to slidably contain the ends of the arms 27 and are connected at their upper ends by a cross bar 29 to hold the same substantially rigid.

Pivotally suspended from between the handle members 24—24' near their lower ends is a T-shaped member comprising a centrally depending post 30 whereon a plow 31, or other ground working tool may be fixed, and pivotally connected with said post by a transverse pin 32, to hold the tool in proper working position are link members 33—33' which extend outwardly and then forwardly and are pivotally connected at their forward ends by bolts 34 to the lower ends of the arms 35 of lever members 36—36' pivotally mounted on the opposite end portions of the rear wheel shaft 6 intermediate the frame and handles 24—24'; the said lever members having forwardly extending arms 37—37' adapted to overlie and engage the upper edge of the frame side rails 2—2'.

With this particular link arrangement it will be seen that the power required to pull the tool through the ground is transmitted to the tool through the lever members 36—36' and connecting links 33—33' and that the more power that is exerted, the greater will be the downward pressure of the lever arms 37—37' against the frame rails 2—2', which will incidentally increase the downward pressure at the forward end of the frame and consequently a greater traction bearing is given the belt and slipping thereof is practically impossible.

In order to raise or lower the tool from or into the ground, the operator raises or lowers the outer ends of the handles accordingly, and in order that the tool may be set and locked at an adjusted position, I provide each of the arms 27 with a tooth 38 that are slidably retained in spaced bearings 39—39' on the arms 27 and their forward ends are urged, by springs 40 wound thereon, into engagement with the notched edges 41 of the arcuate guideways 38 so that when the pins are unseated the handles may be adjusted to a certain elevation and retained in such position by seating the teeth 38 in a registering notch as in the guideways.

Fixed to the inner ends of the latch teeth 38 are cables 42—42'; the inner ends of which are fixed to the outer ends of arms 43—43' extending from the ends of a rocker shaft 44 that is revolubly mounted across the arms 25—25'. Extending from the rocker arm 43 to a gripping lever 45 is a link 46 whereby, on pressure of the lever the rocker shaft 44 will be actuated to draw on the cables and release the pins from the notched sector so that the ground tool may be raised or lowered to an adjusted position.

With the parts so constructed and assembled it is apparent that the device, under the power of the engine 14, may be operated over a ground surface and, under the control of the clutch mechanism, may be started or stopped without interferring with a steady operation of the engine.

It is also apparent that by releasing the locking teeth 38 from the notched guide way, the handles may be adjusted to support the ground working tool carried thereby at any desirable depth within the ground or entirely free therefrom.

It will be seen that when the device is in operation, the turns may be made by raising the forward end of the frame from the ground. This is done by first releasing the teeth 38 and lifting the tool from the ground (dotted lines Fig. I) and then locking the arms in their raised position by releasing the teeth. The rearward ends of the handles are then moved downwardly to raise the forward wheel or part of the belt from the ground so that the device may be moved pivotally on the rear wheel and turned in the desired direction. The teeth are then withdrawn from the guideways to lower the front of the frame onto the guard and the tool may then be lowered into the ground and adjusted to the desired working depth. Ordinary curves may be made by proper bearing on the handles and it is not always necessary to raise the tool from the ground.

It will be seen that with the device so constructed, a simple and efficient cultivator is provided, which may be easily operated and controlled by one operator, it is particularly adapted for garden work where larger implements are destructive to the growing plants and by the improved details of tool adjustment and support, the ground may be worked in a desirable manner.

While I have only shown a plow as the ground working tool, it is apparent that various other implements may be used in a like manner without departing from the spirit of the invention.

Having thus described my invention, what I claim as new therein and desire to secure by Letters-Patent, is:—

1. In a cultivator, a supporting frame, front and rear wheel carrying axles on the frame, handles pivotally mounted on the rear axle and adjustable vertically at their outer ends, a ground working tool suspended from the handles and means for locking the handles at different positions relative to the frame to retain the tool at an adjusted position and permit tilting of the front of the frame, the rear axle serving as the pivot.

2. In a cultivator, a supporting frame, front and rear wheel carrying axles on the frame, handles pivotally mounted on the rear axle and having forwardly projecting integral extensions, guides on the frame adjustably engaged by the ends of the forward extensions of said handles, and a ground-working tool extending from the handle.

3. In a cultivator, a supporting frame, front and rear wheel-carrying axles on the frame, guideways fixed on the forward portion of the frame, frame-tilting and ground-tool supporting handles pivotally mounted on the frame at its opposite end and extending rearwardly therefrom, and having upwardly directed extensions projecting from their mounting ends and adjustably engaging the guideways, a ground working tool suspended by said handle and latch devices on said handle, extensions whereby said handles may be adjustably retained to hold the tool at a set position and at the same time be in position to tilt the front of the frame on the rear axle.

4. In a cultivator, a frame comprising spaced side rails, forward and rearward transverse axles mounted on said frame, ground wheels mounted on said axles, handles pivotally mounted on the rearward axle and extending rearwardly from the frame, a ground working tool suspended from the handles and means for locking the handles to retain the tool at a set working position.

5. In a cultivator, a frame comprising spaced side rails, forward and rearward transverse axles mounted in said frame rails, ground wheels mounted on said axles, guide members mounted on the forward end of said frame, handles pivotally mounted on the opposite ends of said rearward axle and extending rearwardly from said frame and having arms extending forwardly from their pivotal points into adjustable locking engagement with said guide members whereby said handles may be locked at an adjusted elevation and a ground working tool suspended from said handles.

6. In a cultivator, a frame comprising spaced side rails, forward and rearward transverse axles mounted in said frame rails, ground wheels mounted on said axles, guide members fixed to the forward end of said frame at its opposite sides and having the rear shaft as their radial center, handles pivotally mounted on the opposite ends of said rearward axle, extending rearwardly from said frame and having arms extending forwardly from their pivotal points and adapted to move at their forward ends within said arcuate guide members, locking devices on said handle arms whereby said arms may be locked at different positions along said guide ways to hold the handles at different elevations and a ground working tool suspended from and movable into and from functional position by the adjustment thereof.

7. In a cultivator, a frame comprising spaced side rails forward and rearward transverse axles mounted in said frame rails, ground wheels mounted on said axles, guide members fixed to the forward end of said frame at its opposite sides and having the rear shaft as their radial center, and having notched edges, handles pivotally carried by the opposite ends of said rear axle extending rearwardly from said frame and having arms extending forwardly from their pivotal points and movable at their forward ends in said guide members, spring pressed latches mounted on said arms engageable with the notched surfaces of the guide members to hold the arms at adjusted position along said guide members, means operable from the rearward ends of the said handle for moving said latch from locking engagement with said notched surface and a ground working tool mounted on said frame and movable by adjustment of said handles into or from functional position.

8. In a cultivator, a frame comprising longitudinally extending side rails, forward and rearward supporting axles, ground wheels mounted on said axles, bell crank levers pivotally mounted on the rear axle; said levers having forwardly extending arms adapted to engage the upper sides of said side rails between the axle mountings and having downwardly extending arms, links fixed to the latter arms at their lower ends and a ground working tool attached to said links.

9. In a cultivator, a frame comprising longitudinally extending side rails, forward and rearward axles mounted in said rails, ground wheels mounted on said axles, handles pivotally mounted on said rear axle and extending rearwardly from said frame, a post pivotally suspended from between said handles, bell crank levers pivotally mounted at opposite ends of said rear shaft having forwardly extending arms adapted to overlie and engage the said side rails between the axle mountings, and having downwardy extending arms, connecting links pivotally attached at their opposite ends to the lower ends of said lever arms and to said tool carrying post and a ground working tool mounted at the lower end of said post.

10. In a cultivator, a frame comprising opposite side rails, forward and rearward axles mounted in said rails, ground wheels mounted on said axles, guide members fixed at the forward end of said frame, handles pivotally mounted on the opposite ends of the rear axle and extending rearwardly from the frame, and having arms extending forwardly and adapted to move within said guide members, means for locking said arms at adjusted positions along said guide members to retain the handles at an adjusted elevation, a post pivotally suspended from between said handles, levers pivotally mounted at opposite ends of said rear shaft having forwardly extending arms adapted to overlie and engage the said side rails between the axle mountings, and having downwardly extending lever arms, connecting links pivotally attached at their opposite ends to the lower ends of said lever arms and to said tool carrying post and a ground working tool mounted at the lower end of said post.

11. A cultivator comprising a frame having opposite side and end rails, transverse, forward and rearward axles mounted in said frame, ground wheels mounted on said axles, guide ways fixed on the forward end of the frame, handles pivotally mounted on the opposite ends of the rear axle at opposite sides of the frame, extending rearwardly from the frame and having arms extending forwardly from their pivotal points and movable within said guide ways, means for locking said arms at different adjustable positions in said guideways, a ground working tool suspended from the handles and movable by said handles from or into functional position and means operable from the rear of said handles for releasing said locking devices from locking engagement with said guideways to permit vertical adjustment of said ground working tool, bell crank levers pivotally mounted on said rear axle, said levers having forwardly extending arms adapted to engage the upper sides of said side rails between the axle mountings and having downwardly extending arms and links pivotally connected at their forward ends to the lower ends of said downwardly extending arms and at their rearward ends to said ground working tool.

In testimony whereof I affix my signature.

JOHN A. COWAN.